(12) United States Patent
Greenberg et al.

(10) Patent No.: US 11,822,015 B2
(45) Date of Patent: *Nov. 21, 2023

(54) SYSTEM AND METHOD FOR GENERATING PPM WAVEFORMS

(71) Applicant: RAYTHEON COMPANY, Waltham, MA (US)

(72) Inventors: Adam Hodge Greenberg, Los Angeles, CA (US); Eran Marcus, Culver City, CA (US)

(73) Assignee: RAYTHEON COMPANY, Waltham, MA (US)

( * ) Notice: Subject to any disclaimer, the term of this patent is extended or adjusted under 35 U.S.C. 154(b) by 775 days.

This patent is subject to a terminal disclaimer.

(21) Appl. No.: 16/863,792

(22) Filed: Apr. 30, 2020

(65) Prior Publication Data

US 2021/0341578 A1     Nov. 4, 2021

(51) Int. Cl.
*G01S 7/484* (2006.01)

(52) U.S. Cl.
CPC ..................... *G01S 7/484* (2013.01)

(58) Field of Classification Search
CPC ...... G01S 7/484; G01S 7/4811; G01S 7/4817; G01S 7/489; G01S 17/89; G01S 17/10; H04L 25/49; H04L 25/4902; H03K 7/04; H04B 14/026
See application file for complete search history.

(56) References Cited

U.S. PATENT DOCUMENTS

| | | | | |
|---|---|---|---|---|
| 4,527,276 | A * | 7/1985 | Gutleber | H04B 14/026 329/313 |
| 9,268,013 | B2 * | 2/2016 | Rieger | G01S 17/18 |
| 9,858,304 | B2 | 1/2018 | Marcus et al. | |

| | | | | |
|---|---|---|---|---|
| 2017/0329010 | A1 * | 11/2017 | Warke | G01S 17/10 |
| 2020/0256960 | A1 * | 8/2020 | LaChapelle | G01S 7/4863 |

FOREIGN PATENT DOCUMENTS

| | | |
|---|---|---|
| CN | 104730535 A | 6/2015 |
| CN | 104168066 B | 8/2016 |

(Continued)

OTHER PUBLICATIONS

Florian Le Bourdais, "The Farthest Neighbors Algorithm" (2015), https://web.archive.org/web/20170222200211/https://flothesof.github.io/farthest-neighbors.html (Year: 2015).*

(Continued)

*Primary Examiner* — Isam A Alsomiri
*Assistant Examiner* — Joseph C Fritchman
(74) *Attorney, Agent, or Firm* — LEWIS ROCA ROTHGERBER CHRISTIE LLP

(57) ABSTRACT

System and method for generating Pulse Position Modulated (PPM) lidar waveforms generating Pulse Position Modulated (PPM) waveforms in a lidar includes: a) creating a modulation pool, based on a maximum nominal pulse repetition frequency (PRF); b) eliminating bad modulation levels from the modulation pool to generate a good modulation pool; c) selecting a modulation level from the good modulation pool to generate a PPM code element; d) repeating steps b and c N times to generate an N-element PPM code, wherein the PPM code is PRF independent; e) selecting a PRF less than the maximum nominal PRF; f) generating a PPM waveform by applying the N-element PPM code to the selected PRF; and g) transmitting the PPM waveform by the lidar toward a target to determine a range to the target.

14 Claims, 4 Drawing Sheets

(56) References Cited

FOREIGN PATENT DOCUMENTS

EP    1 884 800 A1    2/2008
EP    2 694 996 A1    2/2014

OTHER PUBLICATIONS

Chung, F. R. K., Salehi, J.A., and Wei, V.K. "Optical Orthogonal Codes: Design, Analysis, and Applications" (1989) IEEE Transactions on Information Theory, 35 (3) (Year: 1989).*
Gunzung Kim, et al. "Suitable Combination of Direct Intensity Modulation and Spreading Sequence for LIDAR with Pulse Coding", Sensors, vol. 18, No. 12, Nov. 30, 2018 (pp. 1-22).
International Search Report for related International Application No. PCT/US2020/066481, filed Dec. 21, 2020, International Search Report dated Mar. 23, 2021 and dated Apr. 1, 2021 (5 pgs.).
Written Opinion of the International Searching Authority for related International Application No. PCT/US2020/066481, filed Dec. 21, 2020, Written Opinion of the International Searching Authority dated Apr. 1, 2021 (5 pgs.).
International Search Report for corresponding International Application No. PCT/US2020/066666, filed Dec. 22, 2020, International Search Report dated Mar. 25, 2021 and dated Apr. 6, 2021 (4 pgs.).
Written Opinion of the International Searching Authority for corresponging International Application No. PCT/US2020/066666, filed Dec. 22, 2020, Written Opinion of the International Searching Authority dated Apr. 6, 2021 (6 pgs.).

Bansal, S., et al., "Nature-inspired metaheuristic algorithms to find near-OGR sequences for WDM channel allocation and their performance comparison," Opten Math. 2017; 15:520-547.
Dimitromanolakis, A., "Analysis of the Golomb Ruler and the Sidon Set Problems, and Determination of Large, Near-Optimal Golomb Rulers," Department of Electronic and Computer Engineering Technical University of Crete, Jun. 2002, 118 pages.
Erdos, P., et al., "On a Problem of Sidon in Additive Number Theory, and on Some Related Problems," Journal of the London Mathematical Society, vol. 16, 1941, 4 pages.
Fluckiger, D.U. et al., "Optimal pseudorandom pulse position modulation ladar waveforms," Applied Optics, Mar. 20, 2015, vol. 54, No. 9, 4 pages.
Gagliardi, R., et al., "Acquisition Sequences in PPM Communications", IEEE Transactions on Information Theory, vol. IT-33, No. 5, Sep. 1987, 7 Pages.
Hiskett, P. A., et al., "A photon-counting time-of-flight ranging technique developed for the avoidance of range ambiguity at gigahertz clock rates," Optics Express. Sep., 2008, vol. 16, No. 18, 14 pages.
Mao, X., et al., "Pulse position modulation for compact all-fiber vehicle laser rangefinder development," OpticalEngineering. SPIEDigitalLibrary.org, 56(10), Oct. 2017, 9 pages.
Milstein, A.B., et al., "Acquisition algorithm for direct-detection ladars with Geiger-mode avalanche photodiodes," Applied Optics, vol. 47, No. 2, Jan. 10, 2008, 16 pages.

* cited by examiner

SYSTEM AND METHOD FOR GENERATING PPM WAVEFORMS

GOVERNMENT LICENSE RIGHTS

This invention was made with Government support. The Government has certain rights in the invention.

FIELD OF THE INVENTION

The disclosed invention relates generally to lidars; and more particularly to system and method for generating Pulse Position Modulated (PPM) lidar waveforms.

BACKGROUND

Pulsed laser radar sensors, also known as lidars or ladars, are active sensing systems that determine the range to a target by measuring the time of flight of short laser pulses reflected off the target. A lidar system generally includes three primary subsystems: a laser transmitter, an optical receiver, and a processor. The transmitter is capable of generating laser pulses when commanded, and of directing these pulses in the direction of the target. A key characteristic of these pulses is that they are each 1-25 nanoseconds in duration, so that the resulting range measurement may be accurate to within a few meters.

The receiver includes an optical system capable of collecting light reflected from the target, and a photodetector that can record the arrival of reflected light. The photodetector is capable of timing the arrival of return pulses with an accuracy similar in scale to the laser pulse duration. The processor is configured to control the operation of the transmitter and receiver, and to extract information about the target from the detections made by the receiver. The processor is also capable of synchronizing the commands issued to the transmitter and the receiver. An essential aspect of the return processing is the ability to determine target characteristics accurately despite complex scattering of the transmitted light, imperfect detection of the returns, unwanted detections due to ambient light and electrical noise, and modulation of the return due to target motion, among other practical complications.

In common operational conditions, the target return from a single transmitted pulse is not sufficient for target detection, and multiple pulses must be used. As is well-known in the art, the pulse waveform, or sequence of times at which pulses are transmitted, needs to be selected carefully to allow unambiguous interpretation of the returns. If pulses are widely spaced, it may be straightforward to associate specific returns with their corresponding transmit pulses, but the integration (or dwell) time required to transmit and receive a sufficient number of pulses may be excessive, and the energy required per pulse may exceed hardware constraints. If pulses are repeated at higher frequency, the integration time and pulse energy may decrease, but the time of flight calculation may become ambiguous.

Some problems of range ambiguity can be solved with the use of waveforms that apply some type of encoding to each pulse. One such encoding generates pulse position modulated (PPM) waveforms. PPM encodes waveforms by modulating the position of each outgoing pulse with respect to some nominal underlying position. This underlying position is determined by the pulse number divided by the reciprocal of the waveform's nominal Pulse Repetition Frequency (PRF). PPM encoding works adequately in some cases, but current methods of constructing these waveforms are computationally intensive and limited in applicability.

The issue of range ambiguity may be eliminated by increasing the PRI long enough to cover the desired range. Using low PRFs would be ideal when trying to cover a long range. However, this is not always feasible during the design of a lidar system. To extend direct-detect lidar performance, the lidar needs the ability to transmit pulse trains with high average power. However, Fiber lasers used in lidars operate most efficiently at high PRFs. But, high PRFs exacerbate the problem of range ambiguity.

Some conventional techniques for determining time of flight from an extended pulsed waveform to compute the cross-correlation between the transmit waveform and a set of recorded photodetection times. However, these techniques are limited to post-collection processing, which limits the speed at which range estimates may be determined. Furthermore, this method does not account for waveform compression or stretching due to target motion.

FIG. 1A shows a typical pseudorandom PPM (PRPPM) waveform. As shown, unambiguous ranging can be accomplished with pulse position modulated codes, where pulse timings are encoded by dithering them from a nominal repetition frequency. FIG. 1B depicts a typical range determination from the PPM waveform of FIG. 1A. As depicted, range can then be unambiguously determined by cross-correlating return timings with transmit timings. The lag associated with the peak of the cross-correlation yields the target round trip time, $t_{RTT}$.

A PPM waveform is considered optimal if the peak of the auto-correlation of the waveform is the only element of the auto-correlation whose value exceeds one. Optimal waveforms are required for determining range to certain kinds of targets.

In some conventional approaches, optimal codes are calculated by starting with a base code, and iteratively expanding it, where at each iteration, a modulation value is selected from the modulation pool. The modulation value is then added as a new code element, and the auto-correlation of the resulting code is calculated. If the auto-correlation has any side-lobes greater than unity (rendering the code non-optimal), then the new code element is removed, the modulation value is removed from the pool, and the process is restarted. Otherwise, the new code element is kept, and the process is restarted However, these conventional methods require re-calculation of the code's auto-correlation (which is $O(N^2 \log N)$) for every iteration. This means that the total runtime is approximately $O(N^3 \log N)$, as long as the probability of triggering the side-lobes condition (i.e., the probability of finding a "bad" code element) remains low. However, as this process progresses, the probability of randomly selecting a bad code element (and therefore triggering the side-lobes condition) rises exponentially. Consequently, this process takes an extremely long time to generate long codes.

SUMMARY

In some embodiments, the disclosed invention is a method for generating Pulse Position Modulated (PPM) waveforms in a lidar. The method includes: a) creating a modulation pool, based on a maximum nominal pulse repetition frequency (PRF); b) eliminating bad modulation levels from the modulation pool to generate a good modulation pool, wherein eliminating bad modulation levels comprises eliminating modulation values that cause baud collisions; c) selecting a modulation level from the good modulation pool to generate a PPM code element; d) repeating steps b and c N times to generate an N-element PPM code, wherein N is an integer greater than 1, and wherein the PPM code is PRF independent; e) selecting a PRF less than the maximum nominal PRF; f) generating a PPM waveform by applying the N-element PPM code to the selected PRF; and g) transmitting the PPM waveform by the lidar toward a target to determine a range to the target.

In some embodiments, the disclosed invention is a lidar for generating Pulse Position Modulated (PPM) waveforms to determine a range to a target. The lidar includes: a processor for creating a modulation pool, based on a maximum nominal pulse repetition frequency (PRF); eliminating bad modulation levels from the modulation pool to generate a good modulation pool. Eliminating bad modulation levels includes eliminating modulation values that cause baud collisions; and selecting a modulation level from the good modulation pool to generate a PPM code element. The processor further repeats eliminating bad modulation levels and selecting a modulation level N times to generate an N-element PPM code, where N is an integer greater than 1; selects a PRF less than the maximum nominal PRF; and generates a PPM waveform by applying the N-element PPM code to the selected PRF. The lidar further includes a transmitter for transmitting the PPM waveform by the lidar toward the target; and a receiver for received a waveform reflected from the target to determine the range to the target.

In some embodiments, the modulation level is selected using a selection function, where the selection function computes a best available next PPM code, and/or is optimized to generate longer PPM codes. In some embodiments, the selection function chooses a new modulation level from the good modulation pool such that the new modulation level maximizes the minimum distance between its own position and position of modulation levels that have been removed from the modulation pool.

In some embodiments, the baud collisions occur when there exist two or more pairs of pulses with shared differences. In some embodiments, the bad modulation levels for the (M+1)-th PPM code element is computed by:

$$j_{bad} = j_{M+1-(i-k)} + j_i - j_k \text{ for } i<k<M \quad (9)$$

where i and k are indices to any ith and kth PPM code elements.

BRIEF DESCRIPTION OF THE DRAWINGS

These and other features, aspects, and advantages of the disclosed invention will become better understood with regard to the following description, appended claims, and accompanying drawings.

DETAIL DESCRIPTION

In some embodiments, the disclosed invention uses a PRF-independent formulation of the waveform construction, where it defines a condition that is used at every iteration to discard from the list of allowed code element values, eliminating computationally expensive tests of randomly selected elements. The disclosed invention then uses a selection function that explicitly computes the best available next element (PPM code). Effectively, this technique solves the forward problem, rather than the inverse problem, by directly determining those code elements that contribute to an optimal code, rather than finding those elements through trial and error. This technique avoids an exponential computational slow-down that affects the conventional approaches. In some embodiments, the disclosed invention is capable of generating substantially longer codes than were previously achieved, and generates those codes much more efficiently.

In some embodiments, the disclosed invention efficiently generates modulation codes that fill the space of available code element values. In contrast to the conventional approaches that experience exponential slow-down as they try to generate longer codes, the present approach explicitly calculates which modulation values are available, and therefore avoids this slow-down. Since codes are now PRF independent, once a list of optimal modulation values is calculated, the list can be added element-wise to a list of nominal pulse timings, where the resulting transmit timings will be optimal. This means that codes can be generated once, and then used across a variety of engagement scenarios that may require multiple transmit PRFs. In contrast, conventional methods require a new code to be recomputed for every unique PRF.

Figure 3:
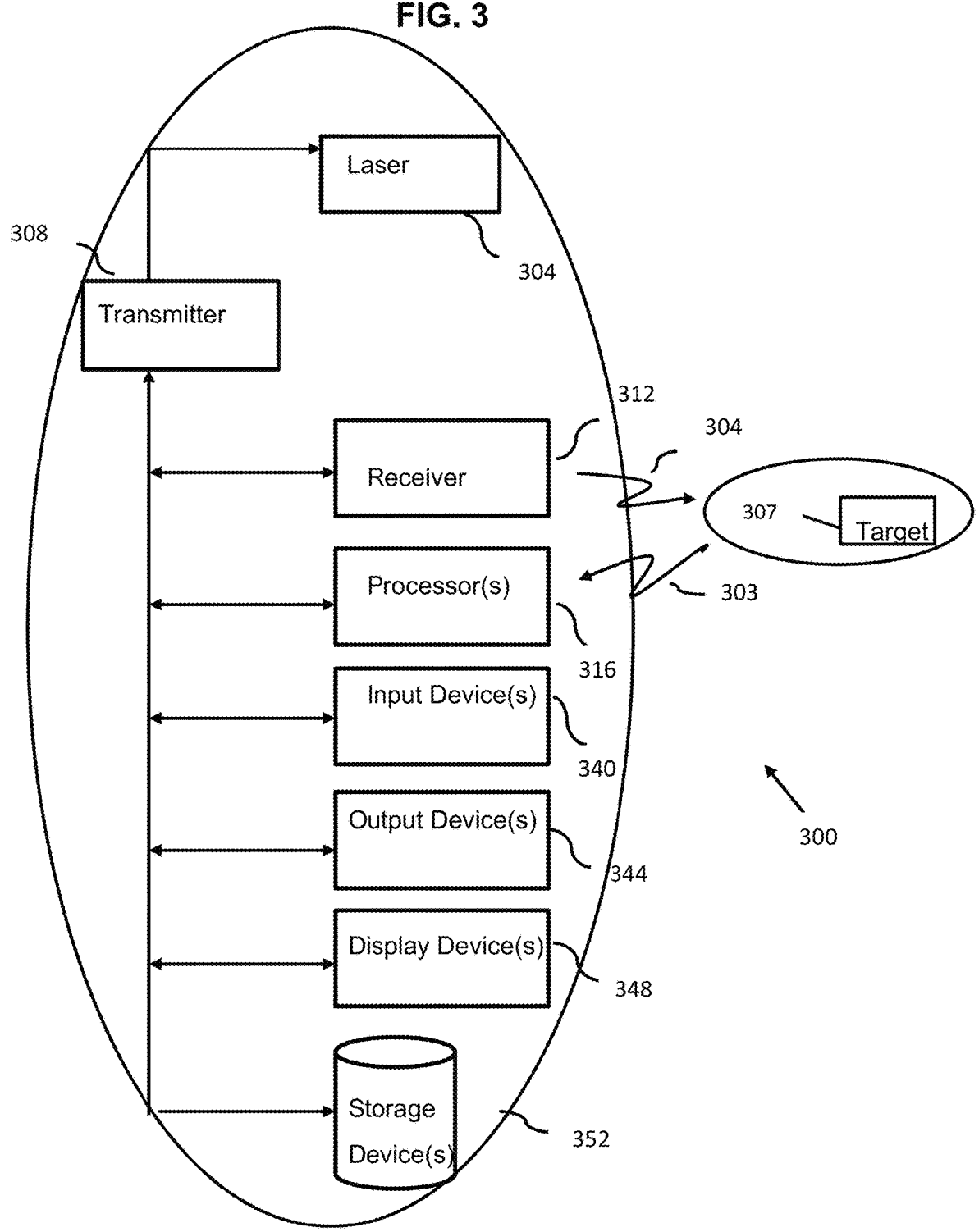
FIG. 3 is a system block diagram of an exemplary lidar system, according to some embodiments of the disclosed invention.

FIG. 3 is a system block diagram of an exemplary lidar system 300, according to some embodiments of the disclosed invention. As shown, a lidar platform includes a laser 304, a transmitter 308 and receiver 312. The transmitter 308 sends lidar transmission pulses 324 towards one or more targets 307 within a region of interest. lidar return pulses (samples) 303 are generated in response to the lidar transmission pulses reflecting off of a plurality of objects (targets) within the region of interest. In some embodiments, the echo from each target (as seen at the receiver) is a version of the transmitted signal that is 1) time delayed by the transit time from transmitter to target to receiver, 2) frequency shifted due to target motion, and 3) attenuated by some factor. The receiver observes a return signal consisting of each of the target echoes (plus random noise).

System 300 also includes one or more input devices 340, one or more output devices 344, one or more display devices 348, one or more processors 316, and one or more storage devices 352. The modules and devices described herein can, for example, utilize the one or more processors 316 to execute computer executable instructions and/or the modules and devices described herein and may include their own processor to execute computer executable instructions. As known in the art, the one or more processors 316 include their own memories, such as RAMs and ROMs to store and execute program instructions. One skilled in the art would understand that the system 300 can include, for example, other modules, devices, and/or processors known in the art and/or varieties of the described modules, devices, analog-to-digital converters (ADCs), digital-to-analog converters (DACs), and/or processors.

The input devices 340 receive information from a user (not shown) and/or another computing system (not shown). The input devices 340 can include, for example, Bluetooth interface, WiFi interface, network interface, a keyboard, a scanner, a microphone, a stylus, a touch sensitive pad or display. The output devices 344 output information associated with the system 300 (e.g., information to remote devices, information to a speaker, information to a display, for example, graphical representations of information). The processors 316 execute instructions for the system (e.g., applications). The storage devices 352 store a variety of information/data, including lidar range data generated by the system 300 and prior measurements. The display devices 348 display information associated with the system 300, for example, target information including their position, distance, type and the like, status information, configuration information and the like. The storage devices 352 can include, for example, long-term storage, such as a hard drive, a tape storage device, or flash memory; short-term storage, such as a random-access memory, or a graphics memory; and/or any other type of computer readable storage. In some embodiments, the process according to the disclosed invention is performed by the processor(s) 316, utilizing some or all of the components illustrated in FIG. 3.

Figure 4:
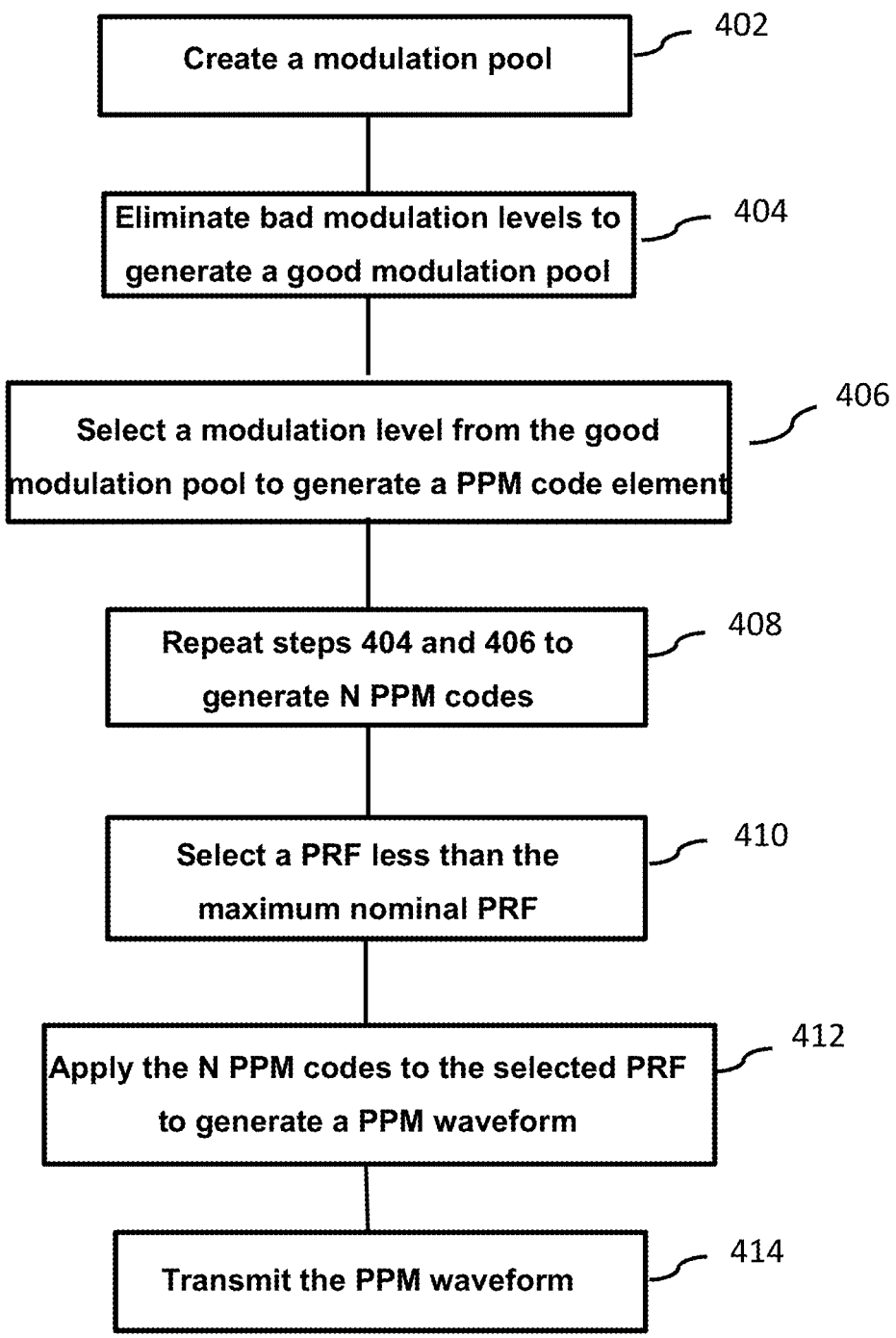
FIG. 4 is an exemplary process flow block diagram for generating PPM waveforms, according to some embodiments of the disclosed invention.

FIG. 4 is an exemplary process flow block diagram for generating PPM waveforms, according to some embodiments of the disclosed invention. In some embodiments, the process starts with an initial optimal list of modulation values of length N, and a table of all pairwise differences between those modulation values, along with how many code elements apart each difference corresponds to, in block 402. Also provided in block 402 is a modulation pool, containing all possible modulation elements that can be generated by the hardware defining the given system. The size of this pool is determined by a chosen maximum nominal PRF—specifically, the number of elements in the modulation pool is given by the ratio of the system's maximum possible modulation to the system's minimum possible modulation. The maximum possible modulation is often expressed as a fraction of the nominal PRI (equal to the reciprocal of the nominal PRF), where this fraction can never be greater than one quarter. Then, some embodiments of the disclosed invention add a new modulation value to the list at position N+1, for example using the following pseudo code.

In block 404, bad modulation levels are determined and eliminated from the modulation pool to generate a good modulation pool. The bad modulation levels are those modulation levels that when placed in the PPM code would cause a baud collision. Baud collisions occur in a code of length N if there exist two or more pairs of pulses with shared differences. In some embodiments, the bad modulation levels are determined according to Equation (9). A single modulation level is then selected from the good modulation, in block 406. In some embodiments, the new modulation level is selected according to a selection function that computes the best available next element. Longer codes can be generated by optimizing the form of the selection function. In some embodiments, the new modulation value is appended to the PPM code.

In block 408, steps 404 and 406 are repeated N times to generate N PPM code elements. Each iteration determines a list of bad modulation values for the (N+1)-th code element. The new code element is then determined by selecting one modulation value from the pool of good modulation values, $j_{good}$. Therefore, there is some flexibility as to how to choose one modulation value from that list. Other techniques for code generation do not have this flexibility, as $j_{good}$ can't be determined. The resulting process generates codes with thousands of elements in seconds, while the conventional approaches may take many hours for the same task.

In block 410, a PRF less than the given maximum nominal PRF is selected. The N PPM codes are then applied to the selected PRF to generate a PPM waveform, in block 412. The auto-correlation function of the resulting waveform has a larger peak to maximum sidelobe ratio (PMSLR) than was previously achievable in waveforms of the same length. Longer waveforms with high PMSLR enable lidar systems to achieve suitable performance at lower average powers, higher pulse repetition rates, and/or longer ranges.

In block 414, the generated PPM waveform is transmitted, for example by a lidar system, toward a target to determine a range to the target. The system and method of the disclosed invention is applicable to and therefore improves the following technologies: target detection and tracking, autonomous vehicles, mining, astronomy, robotics, spacecrafts, geology and soil sciences, agriculture (e.g., seed and fertilizer dispersions, sensing techniques, crop scouting), archaeology (e.g., planning of field campaigns, mapping features under forest canopy, and overview of broad, continuous features indistinguishable from the ground) and many others.

There are significant advantages of the present approach by the disclosed invention. For example, codes can now be generated that fill the space of available modulation values. This approach always explicitly calculates which modulation values are available, and therefore avoids a slow-down in processing time. Also, codes are now (mostly) PRI independent. For instance, once a list of optimal modulation values is calculated, it can be element-wise added to a list of nominal pulse timings, and the resulting transmit timings will have an auto-correlation with no side-lobes greater than unity. Optimality is maintained by the present approach as long as the PRI of the nominal pulse timings maintain the constraint of $$\frac{j_{max}}{PRI} < 0.25.$$

This means that codes can be generated once, and then used across a variety of engagement scenarios that may require a bevy of transmit PRFs. Another advantage over the conventional approaches is that longer codes can be generated by optimizing the form of the selection function, $f_{sel}$, as described below.

There are two considerations of optimal PPM codes to examine for mathematical proof of the above-described process. Both of these considerations rely on another way of looking at code optimality:

A code is optimal if the differences between all pairs of pulses are distinct.

Baud collisions occur in a code of length N if there exist two or more pairs of pulses with shared differences, i.e., if $$t_i - t_j = t_k - t_l, \text{ for } i,j,k,l < N \quad (1)$$

where $t_m$ is the transmit timing of the m-th pulse.

This equation (1) is the general baud collision condition.

Consideration #1

As long as the difference between pulses from adjacent PRIs in a code is always greater than the maximum possible spread in the modulation pool, then the only possible baud collisions that can occur are between pulse pairs that are the same number of PRIs apart. In other words, if we apply the constraint that $(T_{m+1} - j_{max}) - (T_m + j_{max}) > 2 j_{max}$, where $T_m$ is the nominal (i.e., non-dithered) transmit timing of the m-th pulse, then the baud collision condition relaxes to following equation (2):

$$t_i - t_j = t_k - t_l, \text{ for } |i-j| = |k-l|$$

Consideration #2

Define the transmit timing of the m-th pulse, $t_m$, as a sum of a nominal pulse timing, $T_m$, and the corresponding code, $j_m$:

$$t_m := T_m + j_m \quad (3)$$

The nominal pulse timing $T_m$ is just the location of a pulse if a purely periodic pulse timing were used, i.e.:

$$T_m = m T_{PRI} \quad (4)$$

where $T_{PRI}$ is the pulse repetition interval.

This means that the baud collision condition, $t_i - t_j = t_k - t_l$, can be written as:

$$(i T_{PRI} + j_i) - (j T_{PRI} + j_j) = (k T_{PRI} + j_k) - (l T_{PRI} + j_l) \quad (5)$$

or equivalently $$T_{PRI}(i-j) + j_i - j_j = T_{PRI}(k-l) + j_k - j_l \quad (6)$$

If the constraint defined in consideration #1 is met, then it is also known that baud collisions can only occur if $-i-j|=|k-l|$. Inserting this into equation (6) gives a new baud collision condition:

$$j_i - j_j = j_k - j_l, \text{ for } |i-j|=|k-l| \quad (7)$$

Putting together these two considerations, if a constraint is enforced on the waveforms $$(T_{m+1} - j_{max}) - (T_m + j_{max}) > 2 j_{max} \quad (8)$$

Then, the presence of baud collisions is independent of the PRI. Baud collisions is purely determined by which modulation values are applied at which code element position (note that this constraint is equivalent to the requirement that $$\frac{j_{max}}{PRI} < 0.25,$$

while most lidars have the more onerous hardware limitations of $$\frac{j_{max}}{PRI} \leq 0.1).$$

This means that with a list of N modulation values that are optimal, one can directly determine which modulation values, when placed at the (N+1)-th code element position, would cause a baud collision. Specifically, one can explicitly compute all of the bad modulation values, $j_{bad}$, for the (N+1)-th code element, via:

$$j_{bad} = j_{N+1-(i-k)} + j_i - j_k \text{ for } i < k < N \quad (9)$$

where i and k are indices to any ith and kth code elements. Then one can simply discard all the bad modulation values, and select a new code element from the remaining modulation values.

In some embodiments, the process starts with an initial optimal list of modulation values of length N, and a table of all pairwise differences between those modulation values, along with how many code elements apart each difference corresponds to. Then, it adds a new modulation value to the list at position N+1, for example using the following pseudo code.

- For i = 0 to N − 1
  - Add to the (N − i)-th modulation value all the differences that were calculated between modulation elements separated by i + 1 elements
  - Remove the resulting values from the pool of available modulation levels
- Using a selection function (discussed below), choose a new modulation value from the culled pool of available modulation values. Note that this value is guaranteed to maintain code optimality, and therefore the auto-correlation need not be calculated
- Add the difference between the new modulation value and all previous modulation level values to the list of differences
- Increment N and return to start With this process, each iteration determines a list of bad modulation values for the (N+1)-th code element. The new code element is then determined by selecting one modulation value from the pool of good modulation values, $j_{good}$. Therefore, there is some flexibility as to how to choose one modulation value from that list. Other techniques for code generation do not have this flexibility, as $j_{good}$ can't be determined. This choice is performed by a selection function, $f_{sel}(j_{good})$. The nominal selection function is to choose a modulation value at random, i.e., $f_{sel}(j_{good}) = \text{randsample}(j_{good})$. That is, the selection function selects a modulation level via random sampling of the good modulation pool.

The computational order of the above process is $O(N^3)$. However, one can reduce the asymptotic complexity, if baud collisions are allowed to occur between codes separated by more than $N_{corr}$ elements. For ranging purposes, this corresponds to a code that is optimal for targets within a maximum range of $$R_{max} = N_{corr} \times PRI \times \frac{c}{2}.$$

In practice, targets will always have a maximum upper range. Allowing baud collisions beyond $N_{corr}$ elements means that for each iteration, only $N \times N_{corr}$ additions need be performed with elements of the difference table. Therefore, the total runtime drops to $O(N^2)$.

As a non-limiting example, a Matlab™ code is shown and described as follow, where initial set-up is determined based on three inputs:
- A desired code correlation extent of ncorr
- A maximum modulation level jmax, in units of the modulation level resolution
- a maximum desired code length of Nmax

```
% define the pool of jitter values
js = -jamx:jmax;
% Js will hold our list of jitter values
Js = zeros([1 Nmax]);
```

```
% M is a mask for allowed jitter values. M must be three times larger
% than the actual pool itself (which has 2*jmax+1 elements)
M = zeros([1 6*jamx+1], 'logical');
% ind0s stores the indices in our jitter pool mask that correspond to
% real jitter values (i.e., those between –jmax and jmax)
ind0s = 2*jmax+1:4*jmax+1;
M(ind0s) = true;
% diffs stores the list of pairwise jitter differences
diffs = ones([Nmax ncorr+1]) * jmax * 2;
```

The following (code for) calculation involves looping over as many code elements as are needed. The resulting list of modulation values (Js) can be element-wise added to a set of nominal PRI timings to yield an optimal code. In this code, fsel is the selection function for choosing a new code element from the pool of allowed modulation values.

```
% loop until either we've hit the longest code that is needed (or until
% we detect we are boxed in)
for N=2:Nmax
    % expand the code by selecting from the pool or legal jitter values
    Js(N) = fsel(js,M(ind0s));
    % reset the pool
    M(ind0s) = true;
    % determine diff indices
    dinds = 1:min(N,ncorr+1);
    % determine J indices
    Jinds = N:-1:max(1,N-ncorr);
    % update the pool of differences
    diffs(N,dinds) = Js(N) – Js(Jinds);
    % calculate the bad jitter values
    badjs = Js(Jinds(1:end–1)) + diffs(1:N,dinds(2:end));
    % convert the jitter values to indices
    inds = badjs + 3*jmax+1;
    % remove illegal jitter values from the pool
    M(inds) = false;
    & if we find that we are boxed in, then the code cannot be expanded
    % further
    if ~nnz (M)
        break
    end
end
```

Optimizing the selection function is now described. As explained above, one step of process involves choosing a new modulation value to append to the PPM code, from the pool of good modulation values, $j_{good}$. $j_{good}$ is guaranteed to only contain modulation values that will avoid a baud collision. In other words, modulation values that cause a baud collision are eliminated, as bad modulation values. The choice of modulation value from $j_{good}$ is performed by a selection function, $f_{sel}(j_{good})$. One advantage of this process is the flexibility that is afforded by being able to tailor the selection function. The conventional approach to code generation does not know a priori which modulation values are "good" or "bad", and therefore can only select values at random until a non-collision is found. This process of random search is the source of the exponential slowdown experienced by current state-of-the-art algorithms, as the random search must be restarted every time a collision is detected. However, it is determined that optimization of the selection function can lead to generation of longer codes, with the same size modulation pool.

The nominal selection function is $f_{sel}(j_{good})$=randsample $(j_{good})$. The length of optimal codes generated with this selection function are generally comparable to those generated by the conventional approaches (provided the conventional approaches are afforded enough compute time to overcome the exponential slowdown). For example, one such function is referred to as MaxMinDist($j_{good}$), which chooses a new modulation value, $j_{new}$, from $j_{good}$, such that $j_{new}$ maximizes the minimum distance between its own position and that of modulation values that have been removed from the pool (if multiple members of $j_{good}$ meet this criterion, then one is chosen at random). In other words, $j_{new}$ is chosen to lie as far as possible from the bad modulation values in the total modulation pool.

Figure 1A:
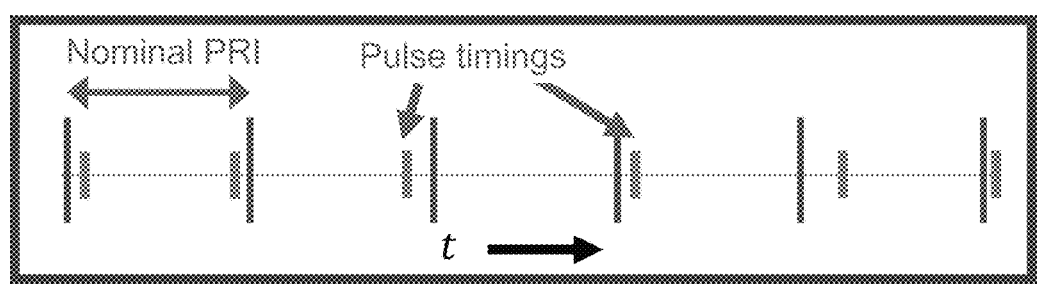
FIG. 1A shows a typical PPM waveform.
Figure 1B:
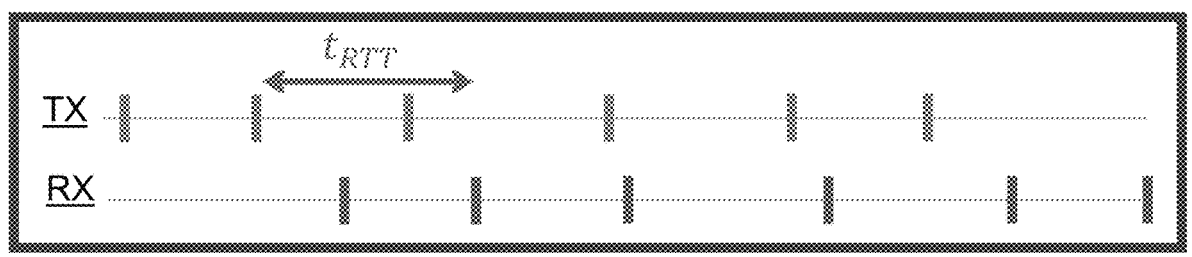
FIG. 1B depicts a typical range determination from the PPM waveform of FIG. 1A.
Figure 2:
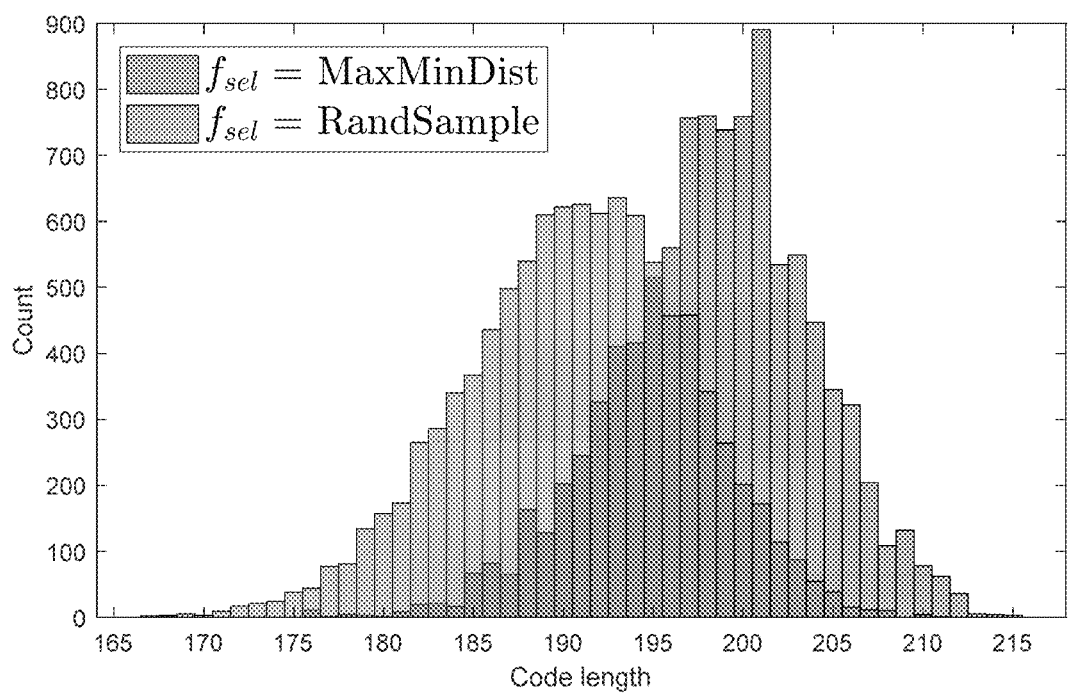
FIG. 2 illustrates a plot of histograms of code lengths generated from a modulation pool with 1000 elements, using both types of selection functions, according to some embodiments of the disclosed invention.

FIG. 2 illustrates a plot of histograms of code lengths generated from a modulation pool with 1000 elements, using both types of selection functions, according to some embodiments of the disclosed invention. The primary result is that selection functions can be optimized, but their utility requires a process that first calculates $j_{good}$, such as the process described herein. As shown, MaxMinDist($j_{good}$) generated codes that were around 5-10% longer. This way, the selection function can be optimized, but its utility requires process described above that first calculates $j_{good}$.

Since the present process for waveform generation described above is iterative, an initial code (typically of zero length) is built up with optimal modulation levels, until the point where adding any modulation level would render the code non-optimal. It can be useful to have a priori knowledge of where that process can be expected to terminate. For example, defining system requirements (what size modulation pool is needed for a particular length code; defining expected runtime for codes that fill the pool of available modulation level; and/or measuring selection function performance and whether it out-perform a baseline performance. In some embodiments, the expected final code length, $N_{max}$ can be predicted by phrasing the question in the context of the coupon collector's problem.

The coupon collector's problem considers a pool which contains an infinite number of coupons, of which there are $n_c$ distinct groups. Each iteration, a collector randomly selects a coupon from the pool. Determining the expected number of iterations, $\overline{N}$, before the collector will have found at least one coupon from each of the $n_c$ groups is a classic combinatorics problem, and can described as the product of $n_c$ and the $n_c$-th harmonic number:

$$\overline{N} = n_c \times \sum_{i=1}^{n_c} \frac{1}{i} \approx n_c(\ln(n_c) + \gamma) \tag{10}$$

where $\gamma \approx 0.5772$ is the known Euler-Mascheroni constant.

The disclosed invention utilizes a process for adding a new modulation level at the (N+1)-th position of a PPM code by determining which modulation levels would cause a collision. Alternatively, one can say that at iteration N+1, N previous iterations have "collected" modulation level differences. Specifically, iteration number N calculates N new differences, and then adds them to previous modulation level to determine the colliding values (i.e., previously collected coupons). Therefore, iterations 1 through N will have collected a total of N(N+1)/2 modulation levels. As a result, the process may terminate, at iteration $N_{max}$, corresponding to the point at which all the modulation levels from the modulation pool of size $n_d$ have been collected, when $$N_{max}(N_{max}+1)/2 \approx n_d(\ln(n_d)+\gamma) \tag{11}$$

Or, equivalently:

$$N_{max} \approx \frac{-1 \pm \sqrt{1 + 8n_d(\ln(n_d) + \gamma)}}{2} \tag{12}$$

If one generally expects $N_{max} \gg 1$, then this can be further reduced to:

$$N_{max} \approx \sqrt{2n_d(\ln(n_d)+\gamma)} \quad (13)$$

However, sometimes, iterations of this process according to Equation (13) calculate bad modulation levels that lie outside the range of the modulation pool. For example, consider a modulation pool of size 21 (i.e., $j_{max}=10$, and $j=-10$ to 10), and suppose one constructs the initial code $j_1=-10$, $j_2=10$. Then, the third element's only bad modulation level would be $j_{bad}=10+(10-(-10))=30$, which is outside the modulation pool. In the context of coupon collecting problem, this would correspond to occasionally collecting "blank" coupons, that are not members of any of the $n_c$ distinct groups being collected.

The magnitude of this effect on $N_{max}$ can be empirically estimated, if one assumes that the effect acts as a scalar multiplier on the final code length, such that:

$$N_{max} \approx f_{ext} \times \sqrt{2n_d(\ln(n_d)+\gamma)} \quad (14)$$

where $f_{ext}$ is the factor by which code length is extended due to this effect.

As a general heuristic, one expects $1 < f_{ext} < 2$, because the effect will tend to enlarge the pool, but there will never be more than twice as many "blank coupons" as real ones. Referring to the above example, $j_{bad}$ can extend from $-30$ to $+30$, while the modulation pool size only extends from $-10$ to $+10$. In one case, to estimate $f_{ext}$, the above process was used to generate codes for modulation pool sizes between 100 and 20,000, and then fit Equation (14) to the resulting code lengths, with $f_{ext}$ as the single floating parameter. Therefore, one can generally predict maximum code length, $N_{max}$, as a function of modulation pool size, $n_d$, via:

$$N_{max} \approx f_{ext} \times \sqrt{2n_d(\ln(n_d)+\gamma)} \quad (15)$$

where $f_{ext} \approx 1.625$

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended drawings and claims.

What is claimed is:

1. A method, performed by a system, for generating Pulse Position Modulated (PPM) waveforms in a lidar, the method comprising:
    a) creating a modulation pool, based on a maximum nominal pulse repetition frequency (PRF), wherein a number of elements in the modulation pool is given by a ratio of a maximum possible modulation of the system to a minimum possible modulation of the system;
    b) eliminating bad modulation levels from the modulation pool to generate a good modulation pool, wherein eliminating bad modulation levels comprises eliminating modulation values that cause baud collisions, and wherein baud collisions are determined by which modulation values are applied at which code element position;
    c) selecting a modulation level from the good modulation pool to generate a pulse position modulated (PPM) code element;
    d) repeating steps b and c N times to generate an N-element PPM code, wherein N is an integer greater than 1;
    e) selecting a PRF less than the maximum nominal PRF;
    f) generating a PPM waveform by applying the N-element PPM code to the selected PRF, wherein the PPM code is independent of the selected PRF; and
    g) transmitting the PPM waveform by the lidar toward a target to determine a range to the target.

2. The method of claim 1, wherein the modulation level is selected using a selection function.

3. The method of claim 2, wherein the selection function selects a modulation level via random sampling of the good modulation pool.

4. The method of claim 2, wherein the selection function computes a next PPM code such that a new modulation level maximizes a minimum distance between its own position and position of modulation levels that have been eliminated from the modulation pool.

5. The method of claim 2, wherein the selection function is optimized to generate longer PPM codes.

6. The method of claim 2, wherein the selection function chooses a new modulation level from the good modulation pool such that the new modulation level maximizes the minimum distance between its own position and position of modulation levels that have been removed from the modulation pool.

7. The method of claim 1, wherein the modulation values that cause baud collisions, $j_{bad}$, for (N+1)-th code element is computed by:

$$j_{bad}=j_{N+1-(i-k)}+j_i-j_k \text{ for } i<k<N$$

where i and k are indices to any ith and kth code elements.

8. A lidar for generating Pulse Position Modulated (PPM) waveforms to determine a range to a target comprising:
    a processor for creating a modulation pool, based on a maximum nominal pulse repetition frequency (PRF), wherein a number of elements in the modulation pool is given by a ratio of a maximum possible modulation of the system to a minimum possible modulation of the system; eliminating bad modulation levels from the modulation pool to generate a good modulation pool, wherein eliminating bad modulation levels comprises eliminating modulation values that cause baud collisions, and wherein baud collisions are determined by which modulation values are applied at which code element position; and selecting a modulation level from the good modulation pool to generate a pulse position modulated (PPM) code element, wherein the processor repeats eliminating bad modulation levels and selecting a modulation level N times to generate an N-element PPM code, wherein N is an integer greater than 1; selects a PRF less than the maximum nominal PRF; and generates a PPM waveform by applying the N-element PPM code to the selected PRF, wherein the PPM code is independent of the selected PRF;
    a transmitter for transmitting the PPM waveform by the lidar toward the target; and
    a receiver for receiving a waveform reflected from the target to determine the range to the target.

9. The lidar of claim 8, wherein the processor selects the modulation level using a selection function.

10. The lidar of claim 9, wherein the selection function selects a modulation level via random sampling of the good modulation pool.

11. The lidar of claim 9, wherein the selection function computes a next PPM code such that a new modulation level maximizes a minimum distance between its own position and position of modulation levels that have been eliminated from the modulation pool.

12. The lidar of claim 9, wherein the processor optimizes the selection function to generate longer PPM codes.

13. The lidar of claim 9, wherein the selection function chooses a new modulation level from the good modulation pool such that the new modulation level maximizes the minimum distance between its own position and position of modulation levels that have been removed from the modulation pool.

14. The lidar of claim 8, wherein the modulation values that cause baud collisions, $j_{bad}$, for (N+1)-th code element is computed by:

$$j_{bad}j_{N+1-(i-k)} + j_i - j_k \text{ for } i<k<N$$

where i and k are indices to any ith and kth code elements.

* * * * *